(12) United States Patent
Chekansky

(10) Patent No.: US 9,745,997 B2
(45) Date of Patent: Aug. 29, 2017

(54) SPEED SENSOR INSERT WITH BEARING SPACER INDEXING FOR A TURBOCHARGER

(71) Applicant: BorgWarner Inc., Auburn Hills, MI (US)

(72) Inventor: Jason W. Chekansky, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 15/143,994

(22) Filed: May 2, 2016

(65) Prior Publication Data

US 2016/0245303 A1    Aug. 25, 2016

Related U.S. Application Data

(62) Division of application No. 14/420,825, filed as application No. PCT/US2013/052880 on Jul. 31, 2013, now Pat. No. 9,353,760.

(Continued)

(51) Int. Cl.
*F04D 29/42* (2006.01)
*F01D 17/06* (2006.01)
(Continued)

(52) U.S. Cl.
CPC ......... *F04D 29/4206* (2013.01); *F01D 17/06* (2013.01); *F04D 17/08* (2013.01);
(Continued)

(58) Field of Classification Search
CPC ........ F16C 19/02; F16C 19/52; F16C 33/067; F16C 33/605; F16C 35/063; F16C 41/007;
(Continued)

(56) References Cited

U.S. PATENT DOCUMENTS 5,735,612 A * 4/1998 Fox .................. F16C 19/364
                                                    384/448
5,884,980 A * 3/1999 Visser .................... B60B 3/16
                                                    188/218 XL (Continued)

FOREIGN PATENT DOCUMENTS

CN       1952606 A       4/2007
CN     201474835 U       5/2010
(Continued)

OTHER PUBLICATIONS

Chinese Office Action dated Aug. 31, 2016 ; Application No. 201380039355.5; Applicant: BorgWarner Inc.: 10 pages.

*Primary Examiner* — Marcus Charles
(74) *Attorney, Agent, or Firm* — BrooksGroup

(57) ABSTRACT

A number of variations may include a turbocharger bearing housing comprising a bearing bore, a rolling element bearing assembly including an inner race and an outer race having a plurality of ball bearings disposed therebetween, wherein the rolling element bearing assembly is disposed within the bearing bore, a shaft for rotating the rolling element bearing assembly, located and supported within the inner race, a tubular bearing spacer, having at least one radial opening, positioned within the bearing bore, a mounting bore, a generally tubular insert mounted in the mounting bore and extending into the at least one radial opening of the tubular bearing spacer, and a rotational speed sensor mounted to the tubular insert via threaded fitting or friction fit.

8 Claims, 6 Drawing Sheets

Related U.S. Application Data

(60) Provisional application No. 61/684,280, filed on Aug. 17, 2012.

(51) Int. Cl.

| | | |
|---|---|---|
| *F04D 29/053* | (2006.01) | |
| *F16C 41/00* | (2006.01) | |
| *F16C 17/24* | (2006.01) | |
| *F04D 17/08* | (2006.01) | |
| *F04D 29/056* | (2006.01) | |
| *F04D 29/40* | (2006.01) | |
| *F04D 17/10* | (2006.01) | |
| *G01P 3/44* | (2006.01) | |
| *F02B 37/22* | (2006.01) | |
| *F02B 37/12* | (2006.01) | |

(52) U.S. Cl.
CPC .......... *F04D 17/10* (2013.01); *F04D 29/053* (2013.01); *F04D 29/056* (2013.01); *F04D 29/403* (2013.01); *F02B 37/22* (2013.01); F02B 2037/122 (2013.01); F05D 2220/40 (2013.01); F05D 2260/30 (2013.01); F16C 2226/00 (2013.01); F16C 2360/45 (2013.01); G01P 3/446 (2013.01)

(58) Field of Classification Search
CPC ............... F16C 35/067; F16C 2360/24; F16C 2360/45; F16C 2226/00; F16C 17/24; F01D 17/06; F02B 37/22; F02B 2037/122; F04D 17/08; F04D 17/10; F04D 29/053; F04D 29/056; F04D 29/4206; F04D 29/403; F05B 2260/30; F05B 2220/40; G01P 3/446
USPC ............... 384/276, 369, 397, 448, 548, 282; 417/407; 415/170.1
See application file for complete search history.

(56) References Cited

U.S. PATENT DOCUMENTS

| | | | |
|---|---|---|---|
| 6,319,132 B1 * | 11/2001 | Krisher .................. | B60K 17/22 277/423 |
| 7,372,253 B2 | 5/2008 | Biber et al. | |
| 2003/0091253 A1 * | 5/2003 | Morita .................... | B61F 15/20 384/448 |
| 2006/0070462 A1 * | 4/2006 | Takizawa ................ | B60B 27/00 73/862.541 |
| 2010/0281975 A1 * | 11/2010 | LeMerise ................ | G01P 3/488 73/494 |
| 2012/0060496 A1 | 3/2012 | Hertweck et al. | |
| 2012/0305279 A1 * | 12/2012 | Schadow .................. | B25F 5/00 173/171 |

FOREIGN PATENT DOCUMENTS

| | | | | |
|---|---|---|---|---|
| DE | 102009059904 A1 * | 3/2011 | ............. | G01P 1/026 |
| GB | 2324869 A * | 11/1998 | ............. | B60T 1/067 |
| JP | 07325093 | 12/1995 | | |
| JP | 2005009527 | 1/2005 | | |
| JP | 2008039191 A * | 2/2008 | | |
| JP | 2008309520 | 12/2008 | | |
| WO | WO 0220284 A2 * | 3/2002 | ............. | F16C 19/364 |

* cited by examiner

SPEED SENSOR INSERT WITH BEARING SPACER INDEXING FOR A TURBOCHARGER

CROSS-REFERENCE TO RELATED APPLICATIONS

This application is a divisional of prior U.S. application Ser. No. 14/420,825, filed Feb. 10, 2015, which is the National Stage of International Application No. PCT/US2013/052880 filed on Jul. 31, 2013 which claims the benefit if U.S. Provisional Application No. 61/684,280, filed on Aug. 17, 2012.

FIELD OF THE INVENTION

This invention provides an improved means for securing a turbocharger speed sensor which also secures a journal bearing spacer against rotation.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

The wheels in turbochargers are designed to operate at nearly maximum stress at the peak of the operating regime. This produces the best compromise between stress and mass, with respect to the design of the wheels, to provide the lowest inertia at the desired efficiency and pressure ratio for the wheels. The inference of this compromise is that the wheels of a turbocharger cannot be run in an overspeed condition or the wheels will be overstressed. Along with overstress conditions, comes the damage accumulation due to the speed cycles the wheels undergo. Damage accumulation is a major factor in low cycle fatigue (LCF) in turbocharger wheels.

The rotating assembly of a turbocharger rotates at exceptionally high speed in the order of 200,000 RPM for a small rotor and 80,000 RPM for a large rotor. Since the invention of the turbocharger, rotational speeds have climbed steadily. Transient response is a time based metric of the speed change for an accelerating or decelerating engine. The function of the turbocharger is a strong factor in engine transient response. A typical transient response measurement protocol is the time it takes for the engine to get from high idle engine speed to 80% of maximum torque. Because the turbocharger rotational speed is an important component in turbocharger transient response, the faster the speed of the turbocharger at engine high idle speed the shorter the time it takes to get to maximum engine torque. While this is a simplistic view, along with high turbocharger speed at engine high idle, comes high turbocharger speed at maximum engine torque; so the turbocharger must be protected from overspeed.

Before the advent of electronic engine controls, the selection and design of compressor wheels was rather simple with large margins of safety and large altitude compensation margins, so, in general, the wheels ran at comparatively sedate speed levels. With the introduction of electronic engine controls, it became possible to run the turbocharger at, or near, the design limit all the time so accumulation of damage in the wheel became acute, and LCF failures became more common.

Also introduced commercially were variable geometry turbochargers and regulated two stage turbochargers. In each of these cases, it became possible for a turbocharger to "overspeed". With a VTG, closing the vanes down accelerates the exhaust gas onto the turbine wheel blades causing the speed of the rotating assembly to increase. The rotating assembly is associated with inertia, and as a result there is a lag time between the closing of the vanes from high speed and the stop in acceleration of the rotating assembly, and this can cause a maximum speed overshoot. Further, with a regulated two stage turbo, the smaller stage is used for fast engine acceleration and the larger stage is used for supplying sufficient mass flow at the high end of the engine operating regime. If the changeover from small turbocharger to larger turbocharger is delayed, then the speeds of the small turbocharger can go out of range, and the turbo can overspeed.

In order to exercise control over the speed of the rotating assembly, turbochargers are sometimes equipped with speed sensors. Speed sensors come in several types. Variable reluctance (VR) sensors use a coil around a magnet in the end of the sensor. As the rotating target cyclically gets closer and further from the magnet, the attraction forces change the shape of the magnetic field, which induces a measurable voltage in the coil. Another type is an electromagnetic sensor which reads the cyclic impedance of a flat on a rotating shaft. As depicted in FIGS. 1 and 2, the "shaft" (11) of the shaft and wheel which supports the journal bearings has a flat (13) fabricated into it approximately between the journal bearings (64). For symmetrical/balance/stress reasons, sometimes there are opposing flats fabricated into the shaft. In the above sensors types, the flat on the rotating shaft passes by the end (73) of the sensor, thus providing a signal as the distance from the end of the sensor to the proximate surface of the shaft (11) cyclically alters due to the difference in radius from the center of the shaft to the diameter of the shaft and then the flat (13) on the shaft. The signal emanating from the sensor (70) is transmitted to the engine electronic control system via a cable (75)

To fit the speed sensor (70) to a turbocharger bearing housing (20), the threaded portion (71) of the sensor (70) is threaded into a complementary threaded part (21) of the bore into which the speed sensor is located. The depth of the sensor is set and maintained by an inwards facing surface (76) on the sensor locating against an outwards facing abutment on the bearing housing (20). The "gap" between the inner end (73) of the sensor and the outer surface of the rotating shaft (11) must be both set and held constant for the sensor to operate consistently and accurately.

The end of the sensor (73), which is in the realm of 0.75 mm in diameter, generally must be within less than 1 mm proximity with the shaft surface. For designs in which the journal bearings (64) of the turbocharger are axially separated by a spacer (67), the spacer is typically fabricated from a ferrous metal which would shield the rotating shaft's flat-to-diameter cyclic distance variation. Accordingly, a window (68) is provided in the spacer, and the speed sensor tip protrudes through the window. The protrusion of the shaft (72) of the sensor (70) into the spacer (67) constrains the spacer from rotating about the turbocharger axis (1). In the assembly process the spacer is held in position (such that the window (68) in the spacer is aligned with the axis of the sensor) by a magnetic tool inserted into the journal bearing bore before the compressor-end journal bearing is assembled into the journal bearing bore.

Because such sensors are delicate electronic articles living in a thermally and vibrationally harsh environment, they are prone to failure. To replace the speed sensor (70), a technician must unscrew the sensor from the bearing housing (20) and replace the sensor by inserting the end (73) of the sensor (70) through the bearing housing and then spacer window (68). During the removal of the sensor, it is quite easy for the rotating assembly to move rotationally and drag the journal bearing spacer with said rotation, thus moving the window (68) in the spacer (67) from its prior alignment with the axis of the sensor. Since the spacer is at the bottom of a long bore, the technician can not see the position of the window in the spacer relative to the bore into which the sensor is fitted. Failure for the end of the sensor to pass through the window (68) in the spacer can result in damage to the sensor and potential damage to the spacer and bearings.

It is known from WO2012024092, assigned to the assignee of the present application, to fix a rotational speed sensor in a bearing housing recess, and to arrange a resilient sleeve in the bearing housing recess around the rotational speed sensor and engaging with one end into the sensor recess. However, once assembled, it is difficult to gain access to and remove the resilient sleeve for turbocharger overhaul.

Further, the fluctuating torque transmitted from the shaft to the bearing spacer during normal turbocharger operation causes the spacer to wearing and damage the outside of the sensor probe. There is a need to prevent such damage to the sensor probe.

SUMMARY OF THE INVENTION

The present invention provides a turbocharger in which the speed sensor can be removed for service while keeping in place the window in the journal bearing spacer through which the tip of the replacement speed sensor must be inserted. This is done through the use of an insert, which extends through the bearing housing and into the window in the spacer, and remains in place during removal of the speed sensor, so that the speed sensor can be re-installed with the tip of the sensor passing through the window in the spacer. The insert can also be easily removed for disassembly of the turbocharger.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

To solve the problem of the journal bearing spacer rotating while the speed sensor is removed for service or replacement, the inventor generated a design of an insert which allows for the removal of the speed sensor while maintaining alignment of the spacer, thus allowing the speed sensor to be re-inserted through the spacer. Another advantage of the invention is that the insert prevents the spacer from wearing and damaging the outside of the sensor probe which would otherwise be caused by the fluctuating torque transmitted from the shaft to the bearing spacer during normal turbocharger operation. Accordingly, the durability of the speed sensor is improved, and the rate of failure, and the need for replacement, is reduced.

Figure 1:
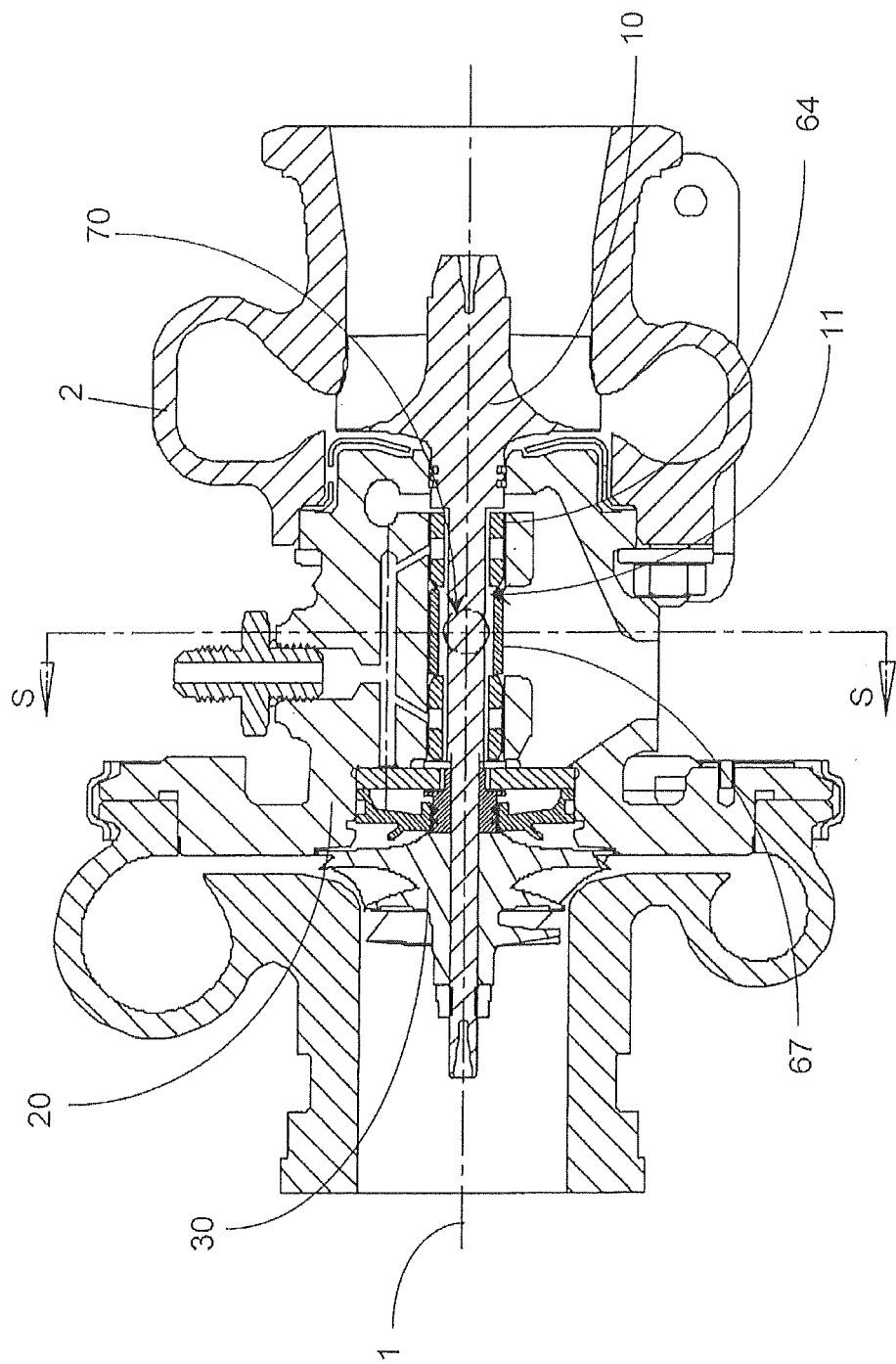
FIG. 1 depicts the section for a typical floating bearing turbocharger.
Figure 2:
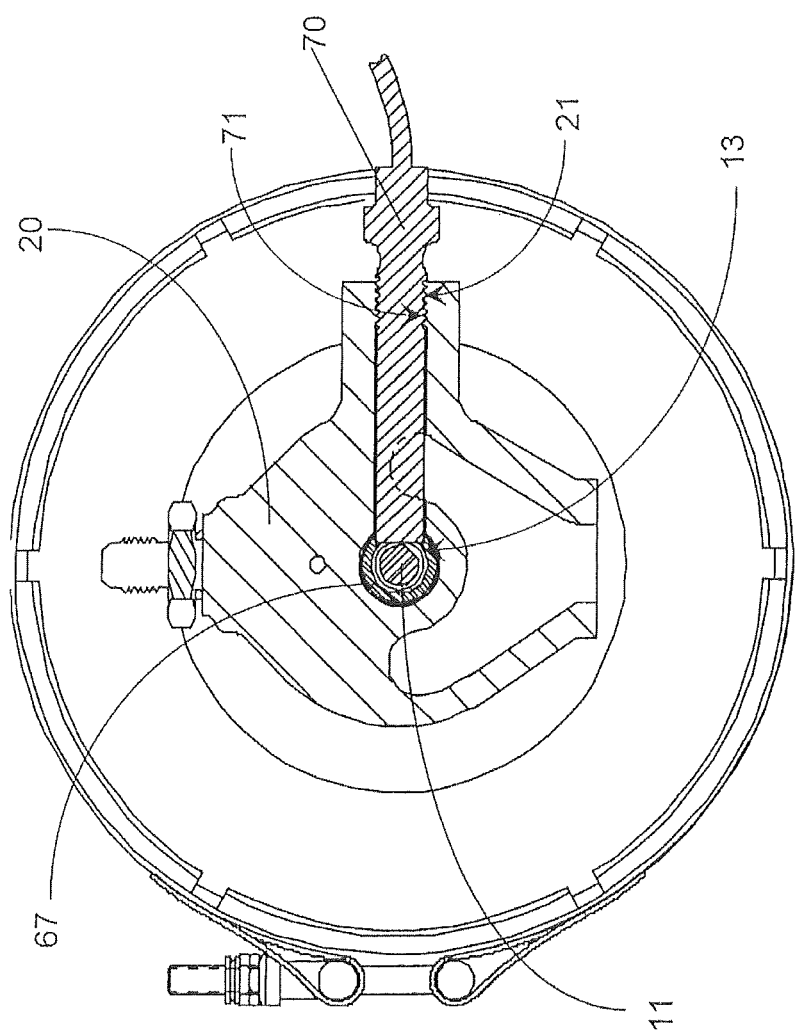
FIG. 2 depicts a, through section "S-S" of FIG. 1 of a typical turbocharger.
Figure 3:
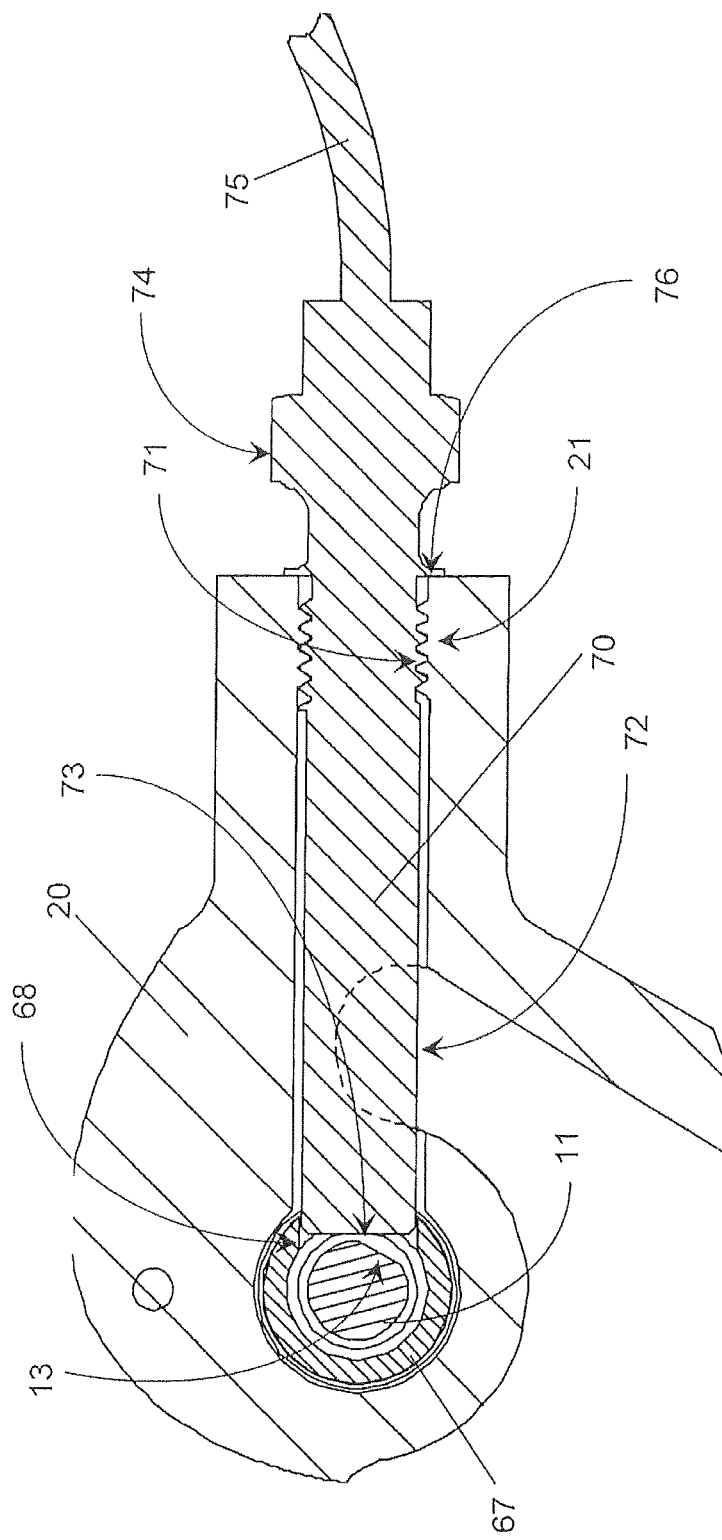
FIG. 3 depicts a magnified view of FIG. 2.
Figure 4:
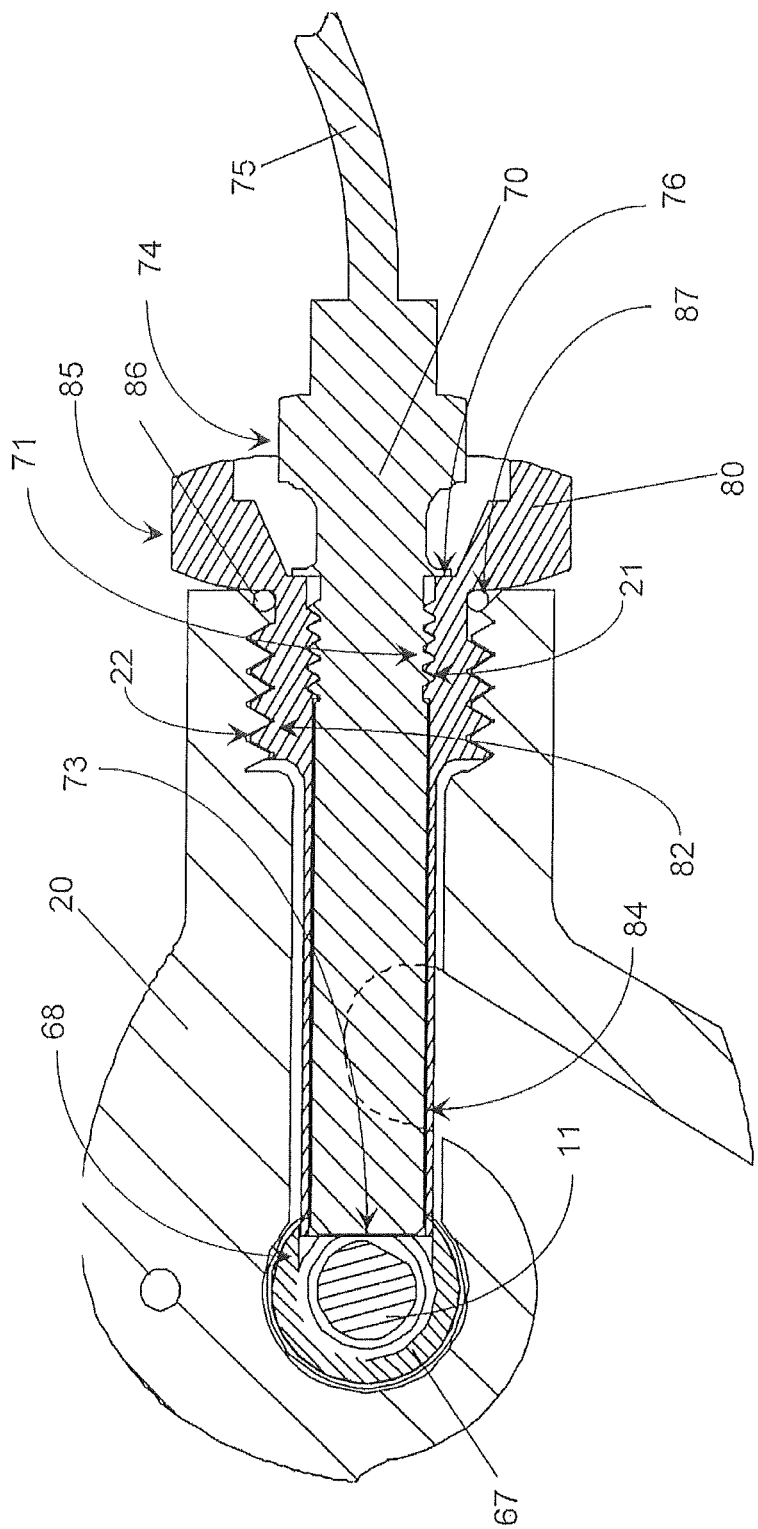
FIG. 4 depicts a magnified view of the inventive insert.
Figure 5:
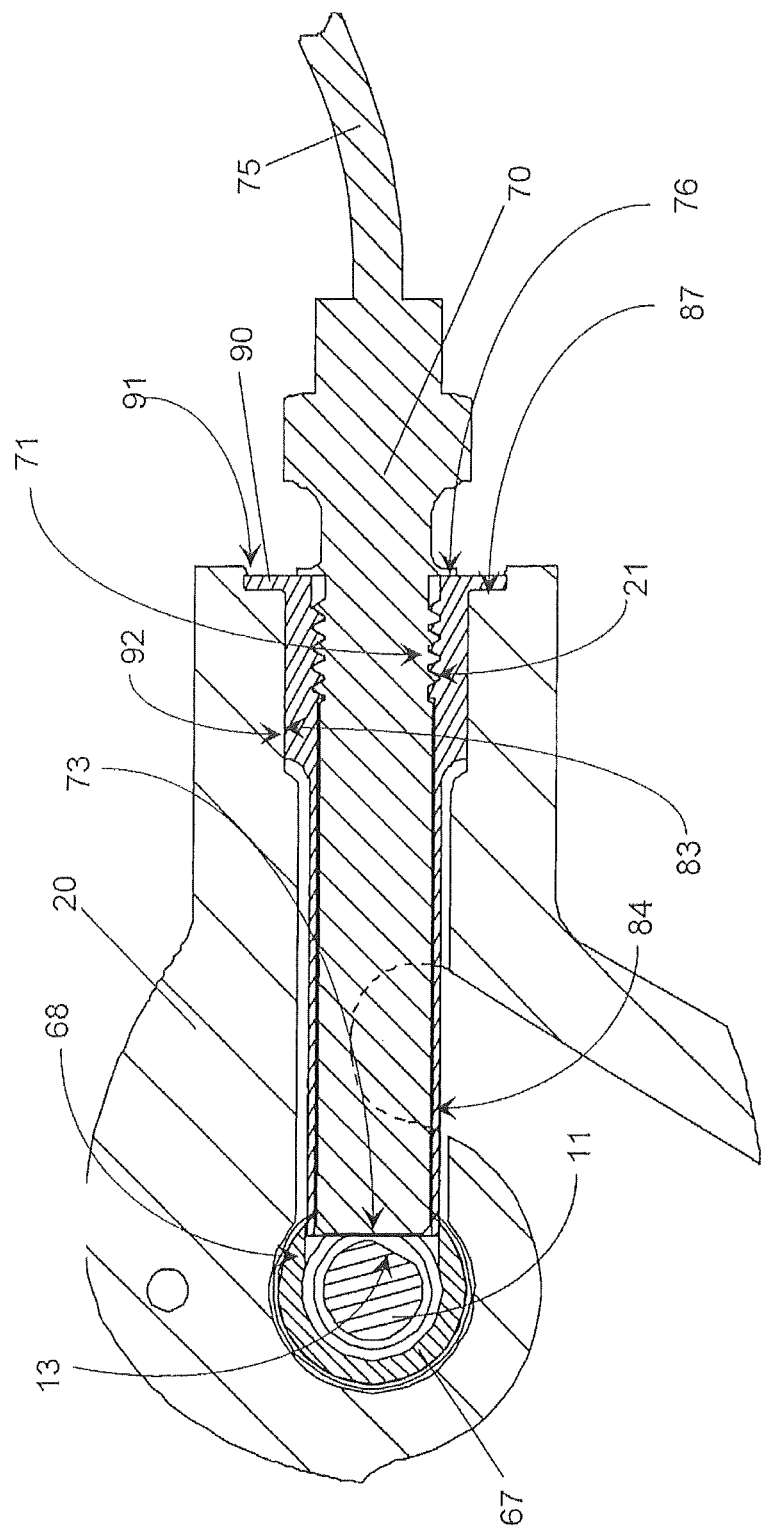
FIG. 5 depicts a magnified view of a variation on the inventive insert.

In a first embodiment of the invention, as depicted in FIG. 4, an insert (80) is screwed into the bearing housing (20) to provide a mount for the speed sensor (70). The insert (80) has a feature (85), such as a hex or flats, so that it can be rotated to be screwed into the bearing housing (20). The insert has an externally facing thread (82) which can be threaded into an internally facing complementary thread (22) in the bearing housing (20). In the preferred mode of the invention, the insert (80) is sealed to the bearing housing (20) by an "O" ring or other suitable means such as tapered threads (86), and the depth of the nose of the insert in the bearing housing (i.e. the distance from the shaft (11) axis) is controlled by the distance from the inward facing surface (87) of the nut or locating feature to the inner end of the insert (80). The inward facing surface (87) of the nut or locating feature is axially constrained by an abutment on the bearing housing (20). The sensor (70) has an externally facing thread (71) which can be threaded into an internally facing thread (21) in the insert.

When the sensor is threaded into the insert, a flange (76) on the sensor abuts against an indexing surface on the insert, thus setting the depth of the sensor in the insert. As explained above, the depth of the insert (in the bearing housing) is set in a similar method with the inwards facing surface (87) of the insert abutting against an outwards facing surface of the bearing housing. Thus the resultant air gap between the end (73) of the sensor and the rotating shaft (11) is set.

The lower end of the tubular part (84) of the insert locates in the window (68) of the spacer (67). When the sensor is removed, the insert remains in place, thus keeping the spacer window aligned with the axis of the sensor position so that the sensor can be re-inserted into its correctly operating position.

Figure 6:
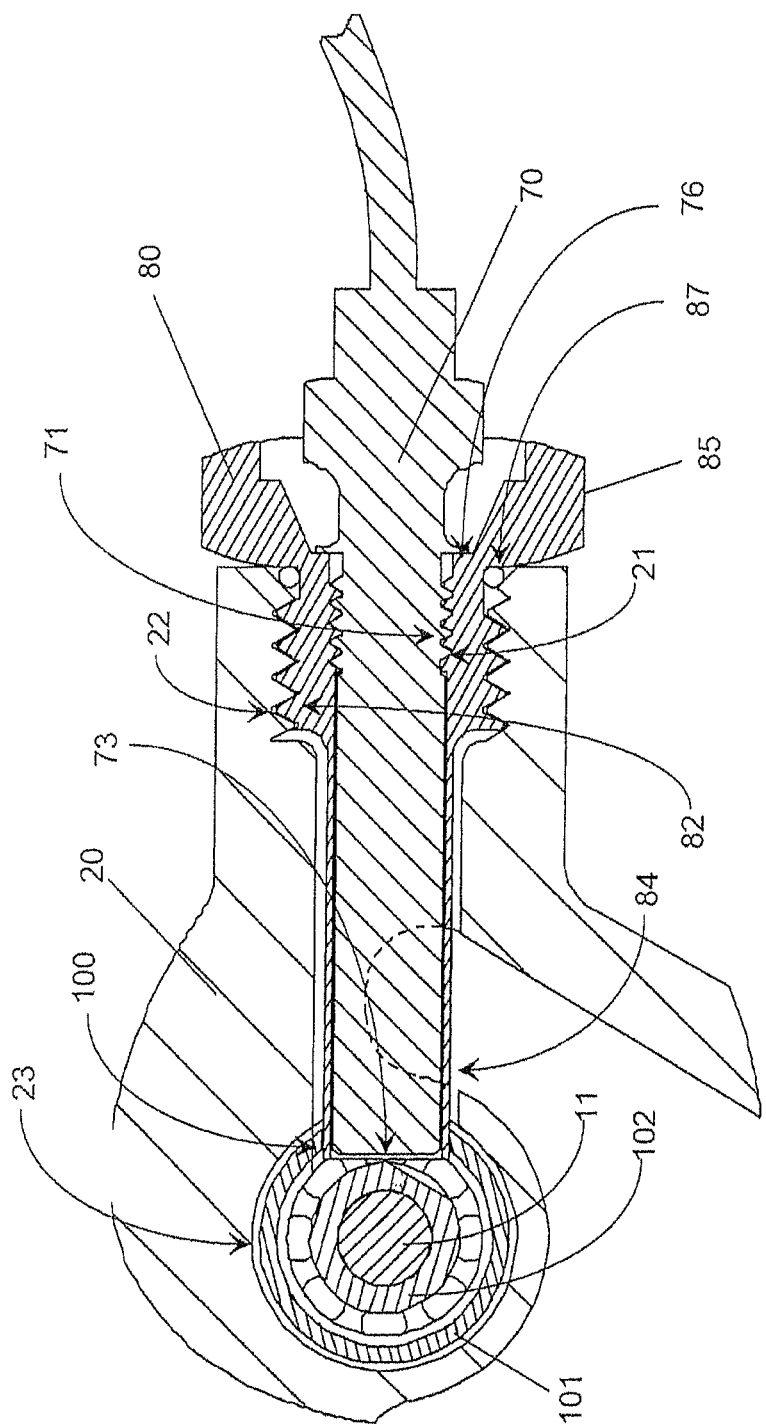
FIG. 6 depicts a magnified view of the second embodiment to the invention.

In a second embodiment of the invention, as depicted in FIG. 6, for sensing the speed of the rotating assembly in turbochargers equipped with rolling element bearings (REB), the outside diameter of the inner race is equipped with a flat for the purpose of creating a cyclic signal for sensing the rotational speed of the inner race and thus the rotating assembly. In the case in which the inner race is axially split onto two pieces, the flat can be on either inner race piece as long as the sensor axis is axially aligned with the axis of the center of the flat so that the sensor can read a cyclic signal.

In the second embodiment of the invention, the shaft (11) for the rotating assembly is supported and located in an inner race (102) of an REB assembly. The REB assembly (or cartridge) is located within a bore (23) in the bearing housing (20). Typically, the outside diameter of the outer race (101), or in some cases the outside diameter of a cartridge, which contains the outer race (101), is supported by an oil film for the purposes of damping the REB assembly. With no metal to metal contact between the outer surface of the outer race (or cartridge) and the bore (23) in the bearing housing, the outer race is completely unconstrained angularly and axially and is partially constrained radially. The inventor saw the opportunity to provide both axial and angular constraint to the REB outer race (or cartridge) while providing a mount for the speed sensor.

An insert (80) is screwed into the bearing housing (20) to provide a mount for the speed sensor (70). The insert (80) has a feature (85) such as a hex or flats so that it can be rotated to be screwed into the bearing housing (20). The insert has an externally facing thread (82) which can be threaded into an internally facing complementary thread (22) in the bearing housing (20). In the preferred mode of the invention, the insert (80) is sealed to the bearing housing (20) by an "O" ring (86), and the depth of the nose of the insert in the bearing housing (i.e. the distance from the shaft (11) axis) is controlled by the distance from the inwards facing surface (87) of the nut or locating feature to the inner end of the insert (80). The inwards facing surface (87) of the nut or locating feature is axially constrained by an abutment on the bearing housing (20). The sensor (70) has an externally facing thread (71) which can be threaded into an internally facing thread (21) in the insert.

When the sensor is threaded into the insert, an inwards facing surface (76) on the sensor abuts an outwards facing surface on the insert, thus setting the depth of the sensor in the insert. The depth of the insert (in the bearing housing) is set in a similar method with the inwards facing surface (87) of the insert abutting an outwards facing surface of the bearing housing. Thus the resultant air gap between the end (73) of the sensor and the rotating inner race (102) is set.

The end of the tubular part (84) of the insert locates in the window (100) of the outer race (101), thus keeping the outer race window (100) aligned with the axis of the sensor so that the sensor can be re-inserted into its correctly operating position. In a manner similar to the assembly of the sensor directly into the bearing housing, the outer race (101) of the REB is held in position (such that the window (100) in the outer race is aligned with the axis of the sensor) by a magnetic tool inserted into the REB bore (23) before the closure to the REB is assembled.

In this design, the tubular end (84) of the insert (80) thus provides a means of keeping the window (100) in the outer race aligned with the axis of the speed sensor (enabling simple service replacement of the speed sensor) while also providing axial and angular constraint for the outer race (or cartridge) relative to the bearing housing (20).

In a variation to the first and second embodiments of the invention, the insert (80) can be pressed or staked into the bearing housing or soldered or welded, as long as the axial air gap dimension between the end (73) of the sensor and the outside surface of the shaft (11) is maintained and the interface provides for an oil tight seal with the bearing housing to prevent oil leakage. Towards the outer end of the insert (80) is a generally cylindrical outside surface (83), which is pressed or shrunk into a generally cylindrical bore (92), concentric with the axis of the speed sensor (80) in the bearing housing to provide alignment with the desired axis of the sensor. The insert (80) is constrained in an outward direction by staking (91) of the bearing housing material over the outward facing surface of the flange (90).

In further variations to the design, the insert (80) could be constrained in the bearing housing in an outward direction by other mechanical or chemical means such as welding or bonding, or by simply a greater shrink fit of the bore (92) with the surface (83) of the outside of the insert.

What is claimed is:

1. A turbocharger bearing housing, including
a bearing bore,
a rolling element bearing assembly including an inner race and an outer race having a plurality of ball bearings disposed therebetween, wherein the rolling element bearing assembly is disposed within the bearing bore,
a shaft for rotating the rolling element bearing assembly, located and supported within the inner race,
a tubular bearing spacer, having at least one radial opening, positioned within the bearing bore,
a mounting bore,
a generally tubular insert mounted in the mounting bore and extending into the at least one radial opening in the tubular bearing spacer, and
a rotational speed sensor mounted to the tubular insert via threaded fitting or friction fit.

2. The turbocharger as in claim 1, wherein the generally tubular insert is mounted in the mounting bore by a screw fit, a friction fit, a pressed fit or by bonding, staking, or welding.

3. The turbocharger as in claim 1, wherein the tubular insert and speed sensor are provided with indexing features for setting the depth of penetration of the speed sensor.

4. The turbocharger as in claim 1, wherein the insert has internal threading and external threading.

5. The turbocharger as in claim 1, wherein the bearing housing has an outer surface, the tubular insert includes a segment projecting outwards beyond the outer surface of the bearing housing, and wherein said projecting segment includes features for engagement of said insert for rotation.

6. The turbocharger as in claim 5, wherein said features for engagement of said insert for rotation comprise one or more flat surfaces.

7. The turbocharger as in claim 6, wherein said flat surfaces form a hexagon.

8. The turbocharger of claim 1, wherein said outer race includes an outer race window wherein a first axial end of the tubular insert is disposed within said outer race window thereby maintaining the outer race in alignment with an axis of the rotational speed sensor.

* * * * *